United States Patent
Xiao et al.

(10) Patent No.: US 11,555,505 B2
(45) Date of Patent: Jan. 17, 2023

(54) BEARING ASSEMBLY WITH CATALYST-FREE ULTRA-STRONG POLYCRYSTALLINE DIAMOND (PCD) MATERIAL

(71) Applicant: Saudi Arabian Oil Company, Dhahran (SA)

(72) Inventors: Jinjiang Xiao, Dhahran (SA); Guodong Zhan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 191 days.

(21) Appl. No.: 16/892,893

(22) Filed: Jun. 4, 2020

(65) Prior Publication Data
US 2021/0381519 A1 Dec. 9, 2021

(51) Int. Cl.
*F04D 29/046* (2006.01)
*F04D 17/10* (2006.01)
(Continued)

(52) U.S. Cl.
CPC .......... *F04D 29/046* (2013.01); *F04D 13/08* (2013.01); *F16C 17/10* (2013.01); *F16C 2206/04* (2013.01); *F16C 2360/44* (2013.01)

(58) Field of Classification Search
CPC .... F16C 33/043; F16C 2206/04; F16C 17/06; F16C 17/04; F16C 27/02; F16C 2360/00;
(Continued)

(56) References Cited

U.S. PATENT DOCUMENTS 4,720,199 A 1/1988 Geczy et al.
4,889,195 A 12/1989 Kruger et al.
(Continued)

FOREIGN PATENT DOCUMENTS

WO 2012145217 A1 10/2012
WO 2014201458 A1 12/2014

OTHER PUBLICATIONS

Liu et al., Superstrong Micro-Grained Polycrystalline Diamond Compact Through Work Hardening Under High Pressure, Appl. Phys. Lett. 112, Jun. 19, 2001 (2018) ("Liu et al 2018") (Year: 2018).*

(Continued)

*Primary Examiner* — Dominick L Plakkoottam
(74) *Attorney, Agent, or Firm* — Bracewell LLP; Constance G. Rhebergen; Keith R Derrington

(57) ABSTRACT

An electrical submersible pumping system includes thrust bearings and radial bearings fabricated from a micro-grained polycrystalline diamond compact ("USPCD") material that is ultra-strong; and where the USPCD is produced using a catalyst free process. In examples, all components of the bearings are formed from the ultra-strong USPCD material. Pads are in the bearings that have a contact surface, and the pads selectively tilt about a tilt member in response to variations in an opposing contact surface. The tilt members are attached to or otherwise associated with the pads, and are in contact with a resilient member that improves tilting response of the pads. The resilient members are encased in jackets that cover surfaces of the resilient members not in contact with the tilt members. The jackets are set in channels formed in structure of the bearings.

13 Claims, 4 Drawing Sheets

(51) Int. Cl.
*F04D 7/08* (2006.01)
*F04D 13/08* (2006.01)
*F16C 17/10* (2006.01)

(58) Field of Classification Search
CPC .............. F16C 2360/44; F16C 2226/76; F16C 2380/26; F16C 23/02; E21B 4/003; E21B 43/128; E21B 10/22; F04D 29/0413; F04D 13/08; F04D 13/10; F04D 29/047; F04D 29/046; F04D 13/086; F04D 29/041; F04D 29/106; F04D 13/06; F04D 1/00; F04D 29/0465; F04D 29/0473; F04D 29/051; F04D 29/0513
See application file for complete search history.

(56) References Cited

U.S. PATENT DOCUMENTS

| | | | |
|---|---|---|---|
| 5,092,687 A | 3/1992 | Hall | |
| 5,735,668 A | 4/1998 | Klein | |
| 7,552,782 B1 | 6/2009 | Sexton et al. | |
| 7,703,982 B2 | 4/2010 | Cooley | |
| 7,866,418 B2 | 1/2011 | Bertagnolli et al. | |
| 7,870,913 B1 | 1/2011 | Sexton et al. | |
| 8,312,631 B2 | 11/2012 | Sexton et al. | |
| 8,496,075 B2 | 7/2013 | Scott et al. | |
| 8,616,304 B2 | 12/2013 | Scott et al. | |
| 8,651,743 B2 | 2/2014 | Peterson et al. | |
| 8,678,657 B1* | 3/2014 | Knuteson | F16C 17/028 384/282 |
| 9,017,043 B2* | 4/2015 | Parmeter | F04D 13/08 166/105.3 |
| 9,127,708 B2* | 9/2015 | Gonzalez | F16C 17/10 |
| 9,488,221 B2* | 11/2016 | Gonzalez | F16C 17/12 |
| 9,488,229 B2 | 11/2016 | Meier et al. | |
| 9,702,401 B2* | 7/2017 | Gonzalez | E21B 4/003 |
| 9,790,992 B1* | 10/2017 | Lingwall | F16C 33/1095 |
| 9,926,977 B2* | 3/2018 | Cooley | F16C 33/043 |
| 10,294,986 B2* | 5/2019 | Gonzalez | F16C 17/03 |
| 10,711,792 B2* | 7/2020 | Vidalenc | F04D 27/001 |
| 10,738,821 B2* | 8/2020 | Miess | F16C 17/02 |
| 11,286,985 B2* | 3/2022 | Prevost | F16C 27/02 |
| 2004/0144534 A1* | 7/2004 | Lee | E21B 43/128 166/66.4 |
| 2008/0078560 A1* | 4/2008 | Hall | E21B 43/128 166/66.4 |
| 2011/0024198 A1* | 2/2011 | Dick | E21B 10/23 175/371 |
| 2011/0174547 A1* | 7/2011 | Sexton | F16C 33/043 310/90 |
| 2012/0048625 A1* | 3/2012 | Bellin | E21B 10/5676 51/293 |
| 2012/0281938 A1* | 11/2012 | Peterson | F16C 17/03 384/306 |
| 2013/0037328 A1* | 2/2013 | Sexton | F16C 17/02 384/227 |
| 2013/0170778 A1 | 7/2013 | Higginbotham et al. | |
| 2014/0064646 A1 | 3/2014 | Meier et al. | |
| 2015/0211527 A1* | 7/2015 | St. John | F04D 13/10 417/423.3 |
| 2015/0354582 A1* | 12/2015 | Tanner | F04D 7/04 418/220 |
| 2016/0010439 A1* | 1/2016 | Parmeter | F04D 29/126 415/104 |
| 2017/0067471 A1* | 3/2017 | St. John | F04D 29/047 |
| 2017/0362899 A1* | 12/2017 | Belnap | E21B 10/5673 |
| 2018/0209476 A1* | 7/2018 | Gonzalez | F16C 17/03 |
| 2018/0274548 A1* | 9/2018 | Vidalenc | F16C 39/02 |
| 2019/0063495 A1 | 2/2019 | Peterson et al. | |
| 2020/0325933 A1* | 10/2020 | Prevost | F16C 33/26 |

OTHER PUBLICATIONS

Sanchez, L.M, et al., 2017, "First Successful Experience of Hardened Stages for Sandy Wells at Northern Llanos Field", Case History, SPE Electric Submersible Pump Symposium held in the Woodlands, Texas, USA, Apr. 24-28, 2017, SPE-185270.

Takacs, Gabor, "Electrical Submersible Pumps Manual: Design, Operations, and Maintenance", Gulf Professional Publishing,2009, Chapter 3, pp. 51-68.

Abdou, H. A., "Case History in Solving ESP Problems in Oil and Water Wells, presented at the 8th Abu Dhabi International Petroleum Exhibition and Conference" Abu Dhabi, UAE, Oct. 11-14, 1998, SPE-49542-MS.

Liu J. et al., "Superstrong micro-grained polycrystalline diamond compact through work hardening under high pressure", Applied Physics Letters 112, Jun. 19, 2001 (2018).

Macneil, D. and Dass, "Replacing ESP and Gas Lift with ESTSP (Electric Submersible Twin Screw Pumps)", SPE Artificial Lift Conference & Exhibition, Manama, Bhahrain, Nov. 27-28, 2012, SPE-163115.

Merrill, Dan and Dwiggins, Jeff, "Understanding Seal Sections and the Phantom Failures", SPE Electric Submersible Pump Symposium, the Woodlands, Texas, USA, Apr. 24-28, 2017, SPE-185133-MS.

Muecke, N. B., et al.,"ESP Design Changes for High GLR and High Sand Production: Apache Stag Project", SPE Asia Pacific Oil and Gas Conference and Exhibition, Melbourne, Australia, Oct. 8-10, 2002, SPE-77801.

Pastre, L. F. et al.,"The Evolution of ESP Technology in the North Sea: A Reliability Study Based on Historical Data and Survival Analysis", SPE Russian Petroleum Technology, Moscow, Russia, Oct. 16-18, 2017,SP E-187735-MS.

Pino, J. D. et al., "Electric Submersible Pumps (ESP) Performance Improvement by Implementation of Extreme Performance Motor Technology in Cano Limon Field", SPE Artificial Lift Conference, Salvador, Bahia, May 27-28, 2015, SPE-173915-MS.

Wilson, B. L.,"The Effects of Abrasives on Electric Submersible Pumps, SPE Drilling Engineering", Jun. 1990, SPE-17583-PA.

PCT ISR and Written Opinion of the International Searching Authority issued for PCT/US2021/035602, dated Sep. 22, 2021, 14 pages.

* cited by examiner

BEARING ASSEMBLY WITH CATALYST-FREE ULTRA-STRONG POLYCRYSTALLINE DIAMOND (PCD) MATERIAL

BACKGROUND OF THE INVENTION

1. Field of Invention

The present disclosure relates to a bearing assembly having a catalyst free ultra-strong polycrystalline diamond material and with compliant features to facilitate tilting.

2. Description of Prior Art

Electrical submersible pumping ("ESP") systems are deployed in some hydrocarbon producing wellbores to provide artificial lift to deliver fluids to the surface. ESP systems are also sometimes used to transfer fluids from a wellsite to other equipment or facility for further processing. The fluids are usually made up of hydrocarbon and water. When installed, a typical ESP system is suspended in the wellbore at the bottom of a string of production tubing. Sometimes, ESP systems are inserted directly into the production tubing. In addition to a pump, ESP systems usually include an electrically powered motor for driving the pump, and a seal section for equalizing pressure in the motor to ambient pressure. Centrifugal pumps usually have a stack of alternating impellers and diffusers coaxially arranged in a housing along a length of the pump. The impellers each attach to a shaft that couples to the motor, rotating the shaft and impellers force fluid through passages that helically wind through the stack of impellers and diffusers. The produced fluid is pressurized as it is forced through the helical path in the pump. The pressurized fluid is discharged from the pump and into the production tubing, where the fluid is then conveyed to surface for processing and distribution downstream.

ESP systems typically utilize radial bearings, which are usually simple journal bearings, and that are provided at different locations along the length of the shaft to support to the shaft as it rotates at high speeds. Thrust bearings are also often included in ESP systems, and are used to handle the weight of the shaft, impellers and motor rotors and the axial force generated by the pump. The type of thrust bearing in ESP systems are typically pad-type plane thrust bearing. Both radial and thrust bearings traditionally use liquid film to prevent metal-to-metal contact. Erosion, corrosion, vibration, impact force, heat are all detrimental to the performance of bearings. Bearing failures can lead to vibration, low efficiency, broken shaft, shaft mechanical seal damage, fluid invasion to the motor and motor electrical failure.

SUMMARY OF THE INVENTION

Described is an example of an electrical submersible pumping ("ESP") system that includes a motor, a pump, a seal, a shaft coupled with the motor and the pump and a bearing assembly coupled with the shaft having a bearing pad formed entirely from ultra-strong micro-grained polycrystalline diamond compact ("USPCD") material. In an example, the bearing assembly is a thrust bearing, the bearing pad is an up thrust bearing pad, and the thrust bearing includes an up thrust bearing, a down thrust bearing, an up thrust resilient member included with the up thrust bearing, a down thrust resilient member included with the down thrust bearing, a tilt member lengthwise on the up thrust bearing pad that engages the resilient member in the up thrust bearing, and a down thrust bearing pad having a tilt member along its length that engages the resilient member in the down thrust bearing. In this example the up thrust bearing further includes a planar up thrust base, a plurality of additional up thrust bearing pads, fasteners that couple the up thrust bearing pads to the up thrust base, and a channel lined with a metal casing in which the up thrust resilient member is disposed, and the down thrust bearing further includes a planar down thrust base, a plurality of additional down thrust bearing pads, fasteners that couple the down thrust bearing pads to the down thrust base, and a channel lined with a metal casing in which the resilient member is disposed. In a further example, the bearing assembly includes a planar thrust runner keyed to the shaft and disposed between the up thrust bearing and down thrust bearing. Optionally, the up thrust base, the down thrust base, and the thrust runner are all formed entirely from USPCD material. In an alternative, the ESP system includes an annular shaped inlay on a surface of the planar thrust runner that is in selective sliding contact with the one of the up thrust bearing pads or down thrust bearing pads, and wherein the inlay is formed entirely from USPCD material. In an alternate embodiment, the bearing assembly is a radial bearing made up of an annular housing in which the bearing pad is disposed, and that alternatively is tiltable about a tilting member that is disposed between the bearing pad and the annular housing and optionally includes a resilient member in the housing that is engaged by the tilting member. A jacket can cover lateral and radially outward surfaces of the resilient member, and where the bearing pad tilts about the tilting member in a gimbal like fashion.

Also disclosed herein is an electrical submersible pumping system ("ESP") system that includes a motor, a shaft coupled with the motor, a pump having impellers that engage the shaft, and a bearing assembly coupled with the shaft. In this example the bearing assembly has a substrate with a resilient material, a bearing pad that is formed entirely from ultra-strong micro-grained polycrystalline diamond compact ("USPCD") material and having a contact surface in selective engagement with a rotating element and a side opposite the contact surface that is in tilting engagement with the substrate. The bearing pad is selectively tiltable about multiple axes. In an embodiment, the substrate is a planar base having a channel in which the resilient member is disposed, and a metal casing lining the channel, and wherein a ridge projects from the side opposite the contact surface and which is in contact with the resilient material. In an example of the bearing pad it includes an up thrust bearing pad and the base is an up thrust base, the channel is an up thrust channel, the resilient member is an up thrust resilient member, the metal casing is an up thrust metal casing, and that collectively define an up thrust bearing assembly. The ESP system further optionally includes a thrust runner and a down thrust bearing assembly that is made up of a down thrust bearing pad, a down thrust base, a down thrust channel, a down thrust resilient member, and a down thrust metal casing, and wherein the up thrust bearing assembly, the down thrust bearing assembly, and the thrust runner are formed entirely from USPCD material. In an example, the bearing pad is part of a radial bearing assembly that includes an annular housing in which the substrate is disposed.

Another example of an electrical submersible pumping system ("ESP") system is disclosed that includes a motor having an attached shaft, a pump connected to the shaft distal from the motor, and a bearing assembly in selective rotating contact with the shaft. In this example the bearing assembly includes a bearing pad formed from a polycrystalline diamond compact, and a substrate having a resilient material on which the bearing pad selectively tilts about multiple axes. In one embodiment, the polycrystalline diamond compact is an ultra-strong micro-grained polycrystalline diamond compact formed from a catalyst free process. Optionally, the bearing assembly comprises a thrust bearing and wherein the substrate comprises a base having a channel in which the resilient material is disposed. In an alternative, the bearing assembly is a radial bearing, and wherein the substrate includes an annular housing with a channel in which the resilient material is disposed.

BRIEF DESCRIPTION OF DRAWINGS

Some of the features and benefits of the present invention having been stated, others will become apparent as the description proceeds when taken in conjunction with the accompanying drawings, in which:

FIG. 4A is a side sectional view of the thrust bearing assembly of FIG. 4, and with the tilt pad shown tilted about an axis.

FIG. 4B is a side sectional view of the thrust bearing assembly of FIG. 4 taken along lines 4B-4B and with the tilt pad shown tilted oblique to the axis.

Figure 1:
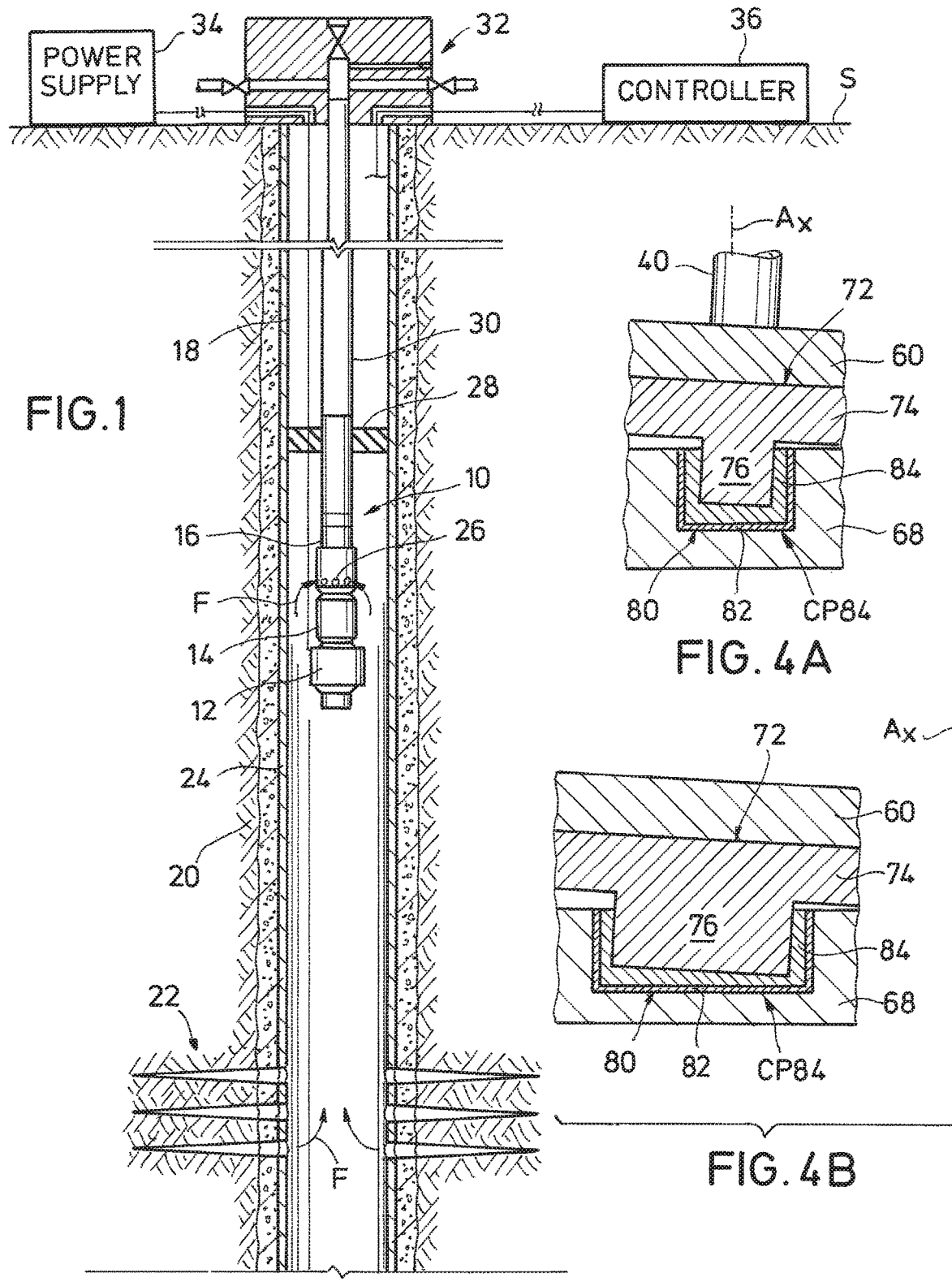
FIG. 1 is a partial side sectional view of an example of an ESP system disposed in a wellbore.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in a partial side section view in FIG. 1 is an example of an electrical submersible pumping ("ESP") system 10 which is shown having a motor section 12, a seal section 14, and a pump section 16. In the example of FIG. 1, the ESP system 10 is disposed in a wellbore 18 shown intersecting a formation 20. Perforations 22 extend radially from the wellbore 18 through casing 24 lining the wellbore 18, and into the formation 20. Fluid F is shown flowing from the formation 20 into the wellbore 18 through perforations 22. Once inside the wellbore 18 the fluid F is routed to inlets 26 shown formed on the pump section 16 of the ESP system 10. A packer 28 fills the annular space between ESP system 10 and walls of wellbore 18 to block the flow of fluid F past ESP system 10 and divert the fluid F into inlets 26. The fluid F is pressurized within the ESP system 10 and discharged into production tubing 30 shown mounted to an upper end of ESP system 10, fluid F flows inside tubing 30 to a wellhead assembly 32 shown on surface S and above an opening of wellbore 18. A schematic example of a power supply 34 is illustrated on surface 34 for powering ESP system 10, also shown on surface S is an optional controller 36 for monitoring and/or sending control commands from surface to the ESP system 10 downhole. Embodiments exist where the controller 36 receives power from power supply 34, and in an alternative controller 36 is combinable with power supply 34.

Figure 2:
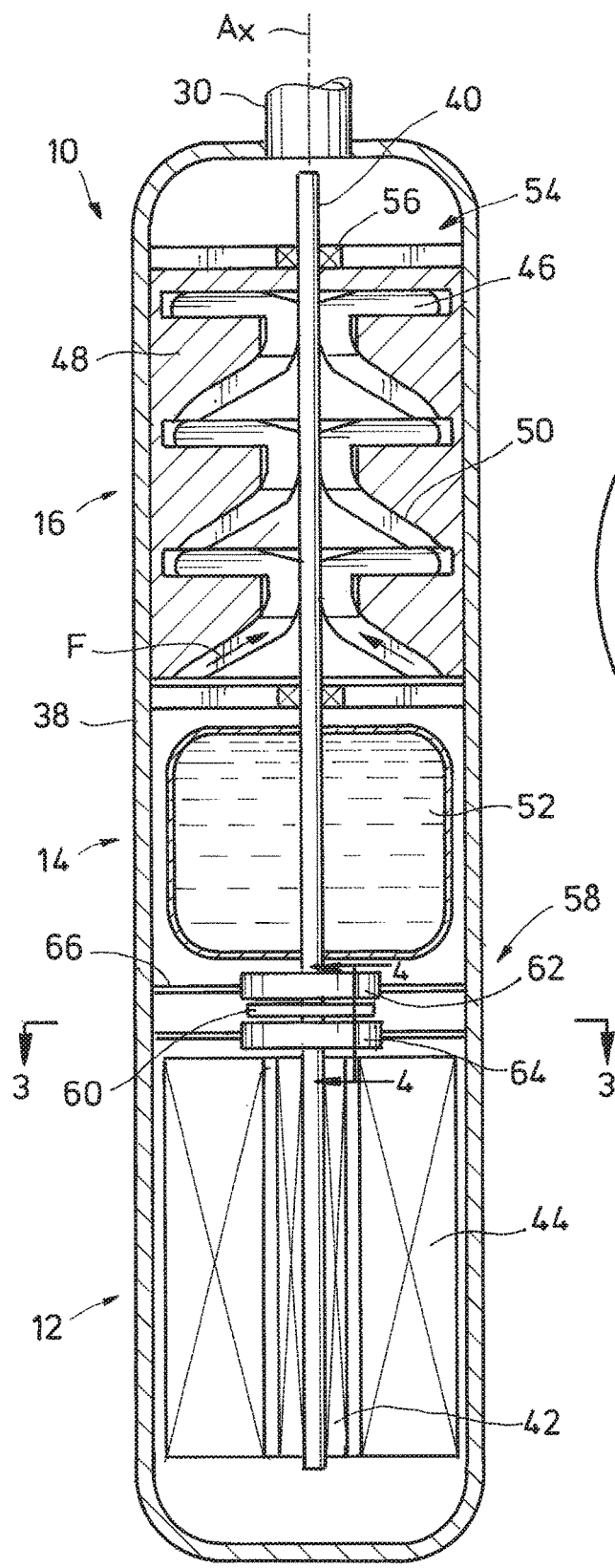
FIG. 2 is a side sectional schematic view of a portion of the ESP system of FIG. 1.

Shown in side sectional view in FIG. 2 is a portion of ESP system 10 and illustrating components within system 10 are within a housing 38. A shaft 40 extends within housing 38 and in the example of FIG. 2 substantially aligned with an axis $A_X$ of ESP system 10. A rotor 42 is shown mounted on an outer surface of shaft 40 and axially disposed within a stator 44. In a non-limiting example of operation, stator 44 is energized by power supply 34 of FIG. 1 to generate an electrical field that rotates rotor 42 and shaft 40. Impellers 46 are illustrated mounted on the outer surface of shaft 40 and within pump section 16. Rotation of shaft 40 causes rotation of impellers 46 within spaced apart diffusers 48 which urges fluid F through a passage 50 shown extending along a helical path through the stack of diffusers 48 and impellers 46. A bladder 52 is shown in seal section 14, in the illustrated example the inside of bladder 52 is in fluid communication with dielectric fluid within motor section 12 and the outer surface of bladder 52 is in communication with ambient to ESP system 10; which equalizes pressure of the dielectric fluid with ambient to the ESP system 10. Equalizing pressure in the dielectric fluid with ambient reduces pressure differentials across seals (not shown) within the ESP system 10.

Schematically shown in FIG. 2 are radial bearing assemblies 54, which in the example shown support shaft 40 within housing 38 and allow rotation of shaft 40. Radial bearing pads 56 are included with the bearing assemblies 54 and which are in selective rotating contact with outer surface of shaft 40. An example of a thrust bearing assembly 58 is shown in FIG. 2, and in a non-limiting example of operation provides support for shaft 40 in response to axial loads resulting from pressurizing fluid through the stacks of impellers 46 and diffusers 48. Included in the thrust bearing assembly 58 is a thrust runner 60 which is disposed between a down thrust bearing 62 and up thrust bearing 64. Support structure 66 provides the port for the up thrust bearing 64 and down thrust bearing 62 within housing 38. In the example shown thrust runner 60 is rotationally coupled to shaft 40.

Figure 3:
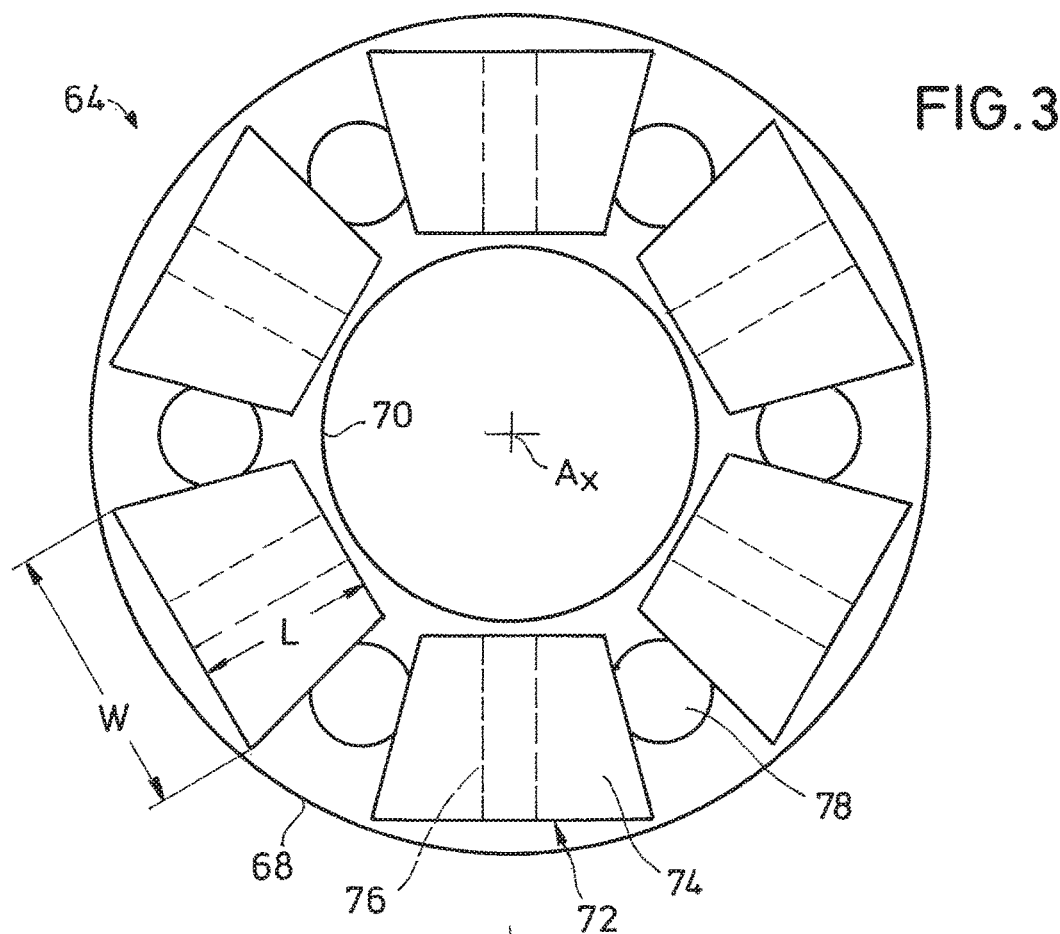
FIG. 3 is a plan view of an example of a portion of a thrust bearing assembly in the ESP system of FIG. 2 and taken along lines 3-3.

An example of an upward facing surface of the up thrust bearing 64 is shown in a plan view in FIG. 3 and taken along lines 3-3 of FIG. 2. Up thrust bearing 64 of FIG. 3 includes a planar disk-like base 68, an opening 70 is formed axially through base 68 and in this example illustrated as being generally coaxial with axis $A_X$ (FIG. 2). Tilting pads 72 are depicted that are arranged circumferentially on the surface of the base 68 facing the thrust runner 60 (FIG. 2), which for the purposes of illustration is alternatively referred to as an upward facing surface. Optionally, while inside wellbore 18 upward refers to a direction towards surface S and downward refers to a direction away from surface S. Pads 72 include a load portion 74 which is a planar-like member and having a contact surface that is in selective sliding engagement with a corresponding sliding surface of the thrust runner 60 of FIG. 2. In the illustrated example, upper and lower surfaces of the load portions 74 have a trapezoid-like configuration, lateral sides of load portions 74 depend towards one another with distance towards axis $A_X$, and so that width W increases with distance away from axis $A_X$. Further shown in this example is that the length L of each of the load portions 74 is the distance of the load portion 74 between the edges of tilting pads 72 that are radially proximate and radially distal from axis $A_X$. Shown in a dashed outline are ridges 76 that extend along the length L of the pads 72, in the example shown ridges 76 substantially follow a radial path that intersects axis $A_X$ and is generally in the center of the width W of pads 72. The ridges 76 depend away from a surface of the pads 72 facing base 68. As described in more detail below, tilting of the pads 72 selectively occurs about a free surface of the ridges 76 distal from load portion 74. The pads 72 are shown coupled with the base 68 by fasteners 78, which include a circular head portion that engages grooves (not shown) formed in lateral sides of the pads 72. A shaft portion of the fasteners 78 is secured to a surface of base 68 facing the pads 72. In the example shown, the pads 72 have some freedom of movement with respect to base 68.

Figure 4:
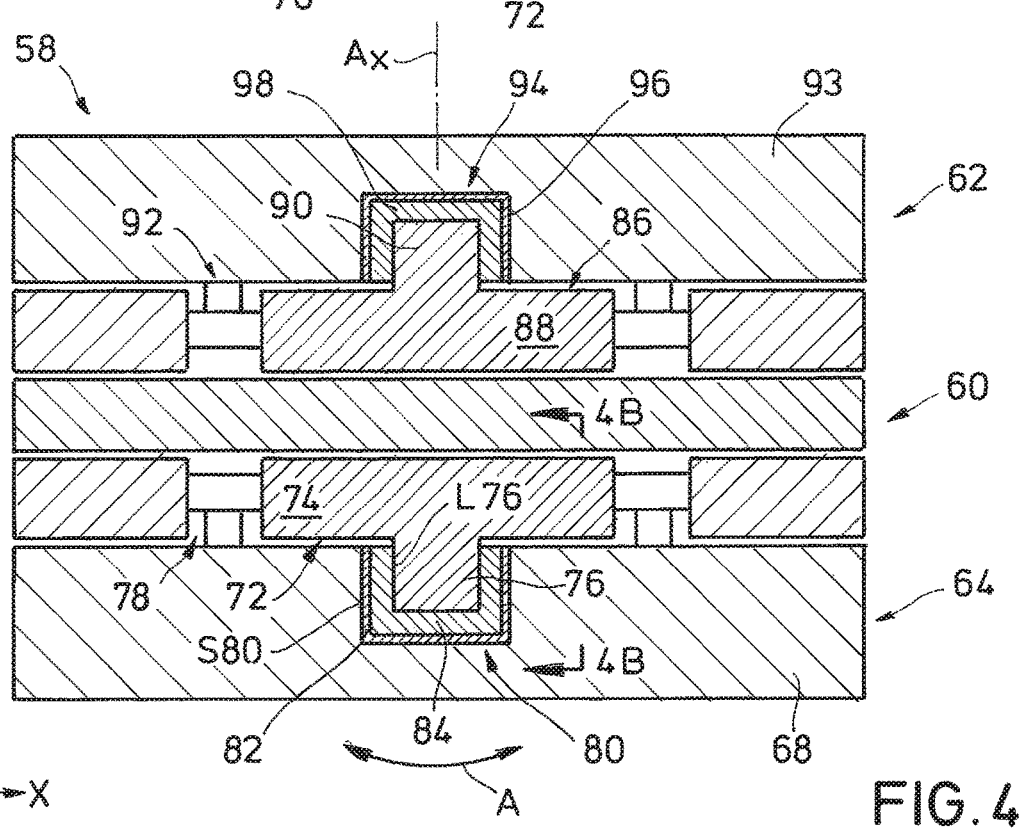
FIG. 4 is a side sectional view of the thrust bearing assembly of FIG. 2 and taken along lines 4-4 of FIG. 3.

A sectional view of the thrust bearing assembly 58 is shown in FIG. 4 and taken along lines 4-4 of FIG. 2. As shown, base 68 has a radially extending channel 80 formed on its upper surface and which receives ridge 76. Channel 80 is lined with a jacket 82, examples of which include metals such as carbon steel, stainless steel, copper, brass, and aluminum, metal alloys, such as nickel alloys and tungsten alloys, composites, such as reinforced carbon-carbon, Kevlar®, ceramics and the like. In the space between jacket 82 and ridge 76 is a resilient member 84 that in a non-limiting example of operation deforms under an applied load and returns to an un-deformed original configuration when the applied load is removed. Example materials for the resilient member include polymers, elastomers, fluoropolymers, fluoroelastomers, nitrile rubber, combinations thereof, and the like. The presence of the resilient member 84 between the ridge 76 and nonresilient portions of base 68 allows for tilting of each of the pads 74 and about multiple axes. For the purposes of convenience, a representative XYZ axis is illustrated in FIG. 4 and for demonstrating that tilting which is represented by curved arrow A, selectively takes place with respect to any one of these axes. An advantage provided by the resilient members is the ability to pivot or tilt in these multiple orientations and respond to variations of orientation of an opposing sliding surface, such as that shown in contact with the upper surfaces of pads 74 of the thrust runner 60.

Further examples of a range of tilting movement is provided in FIG. 4A and FIG. 4B. In FIG. 4A pad 72 tilts about the Z axis that rotates a portion of ridge 76 deeper within channel 80 and compressively deforms a portion of the resilient member 84 to form a compressed portion $CP_{84}$. In a non-limiting example of operation, pad 72 is tilted in response to a change in orientation of thrust runner 60 from being generally perpendicular with axis $A_X$ as shown in FIG. 4, to an orientation that is oblique with axis $A_X$; in one example, the change of orientation of thrust runner 60 is cause by a reorientation of shaft 40 resulting from vibration, reactive forces occurring during pumping operations, or both. In a further example shaft 40 and thrust runner 60 return to their respective orientations of FIG. 4, that is with thrust runner 60 generally perpendicular with axis $A_X$; and the resilient member 84 returns to its configuration of FIG. 4 without a compressed portion $CP_{84}$, due at least in part to elastic characteristics of the resilient member 84. Illustrated in FIG. 4B is an example of pad 72 tilting about the X axis such that a portion of ridge 76 projects farther into channel 80 to form a compressed portion $CP_{84}$ of the resilient member 84, and which in an example is due to a change in orientation of thrust runner 60 as described above. Similarly, when thrust runner 60 returns to the orientation of FIG. 4 and eccentric loading is removed from the pad 72, the resilient member 84 returns to an uncompressed state. In a further example, the presence of the resilient member 84 along the lateral sidewalls $L_{76}$ and side walls $S_{80}$ of channel 80 dampen rotation of pads 72 about the Y axis, and the resilient member 84 returns to the uncompressed state when the ridge 76 is realigned within the channel 80. One of the advantages of the resilient member 84 is that it enhances impact resistance, and allow balanced engagement of all pads 72 with the thrust runner 60.

Referring back to FIG. 4, down thrust bearing 62 is shown positioned on a side of thrust runner 60 opposite the up thrust bearing 64. Illustrated in this example are tilt pads 86 included with down thrust bearing 62 that similar to tilt pads 72 have a load portion 88 and a ridge 90 that projects axially from a side of each pad 86 in direction opposite from thrust runner 60. Fasteners 92 shown that are similar to fasteners 78, and that couple pads 86 to the base 93 of the down thrust bearing 62. Channel 94 is formed through base 93 in a radial direction and which is lined with jacket 96 shown covering a portion of resilient member 98. In this example resilient member 98 occupies the space between ridge 90 and channel 94. In a non-limiting example of operation, as shaft 40 of FIG. 2 rotates, thrust runner 60 is rotated by virtue of the keyed coupling (not shown) with shaft 40 and is in rotational movement with respect to each of the up thrust bearing 64 and down thrust bearing 62. As described above, variations of surface shape, vibration, or flexing of the ESP system 10 causes surfaces of thrust runner 60 to move into an oblique orientation with respect to axis $A_X$. The ability of pads 74, 86 to tilt due to the resilient members 84, 98 compensates for the oblique orientations of thrust runner 60 and maintains a contact interface that is distributed substantially along the entire surfaces of pads 72, 86 facing thrust runner 60.

Figure 5:
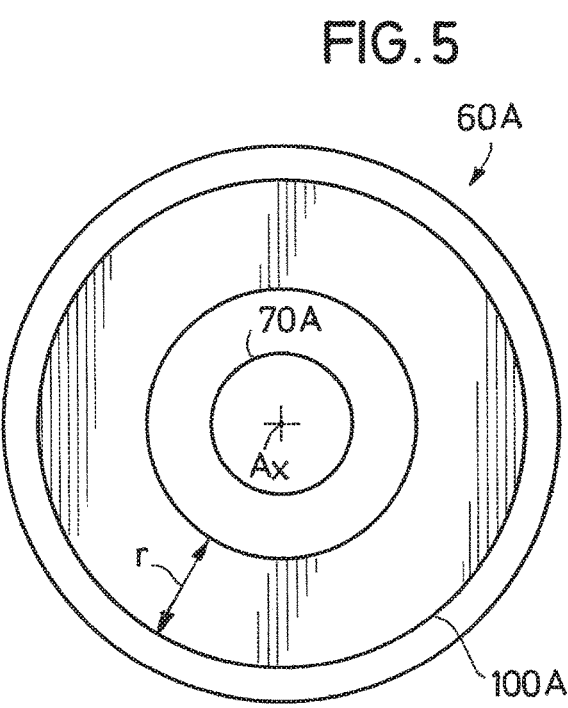
FIG. 5 is a plan view of an alternate example of a thrust runner used in the thrust bearing assembly of FIG. 2.

Shown in a plan view in FIG. 5 is an alternate embodiment of thrust runner 60A and shown having an annular inlay 100A on a contact surface. In a non-limiting example contact surface defines a surface along which selective rotating contact with another member takes place, such as the opposing surfaces of the thrust runner 60 and pads 72, 86. In the example of FIG. 5, the inlay 100A has a generally annular shape and with a radial width that in one example is same as or greater than a length L (FIG. 3) of pads 72, 86. In another example, inlay 100A has an outer surface that projects axially past the thrust runner 60A and has a radius r that is less than L of the pads 72, 86.

Figure 6:
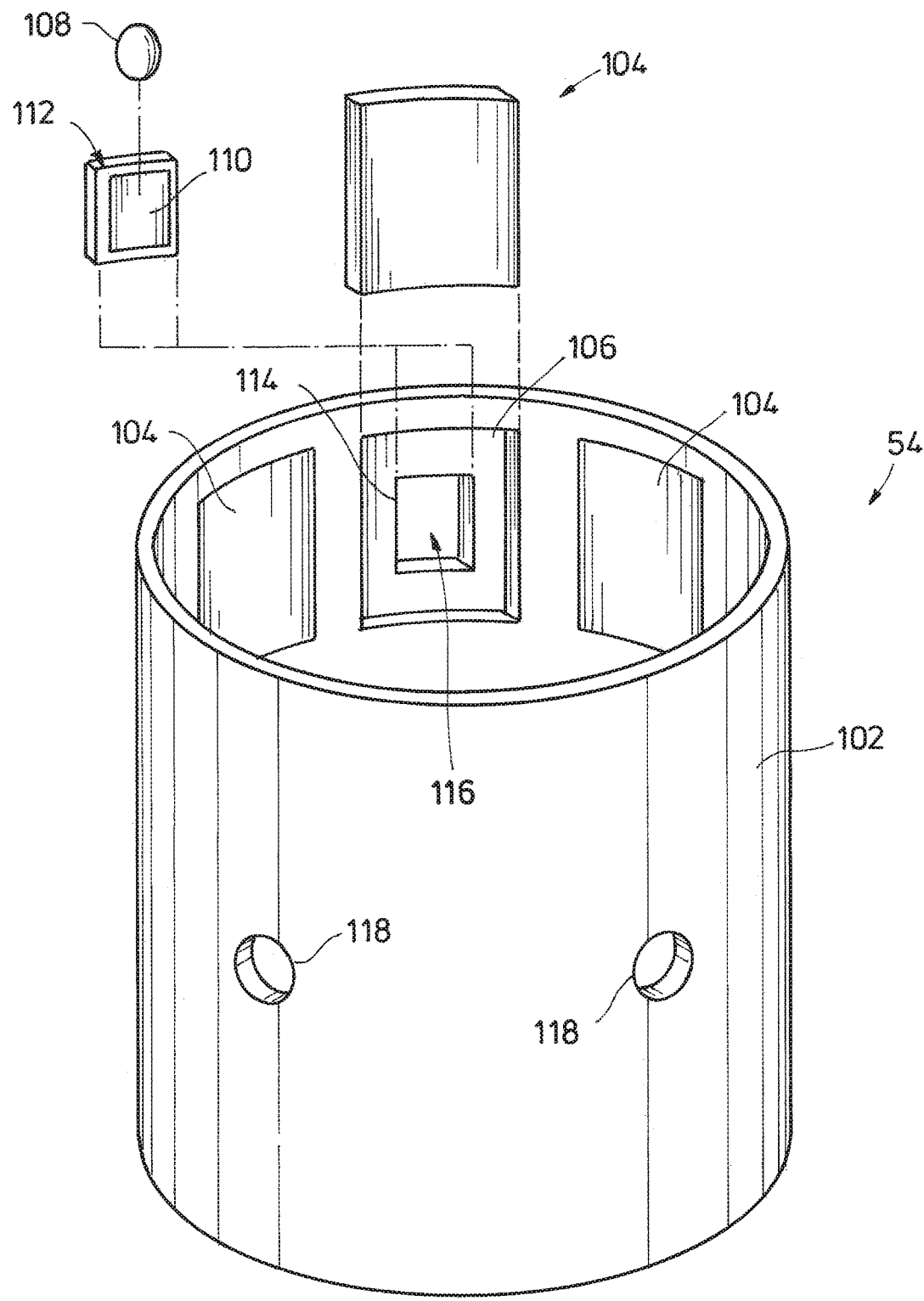
FIG. 6 is a side perspective and partially exploded view of an example of a radial bearing in the ESP system of FIG. 2.

Referring now to FIG. 6, shown is a perspective view of an example of a radial bearing 54 and which includes an annular housing 102. Radial bearing pads 104 are shown set along an inner surface of the housing 102 and which are in contact with shaft 40 of FIG. 2. In the illustrated example, recesses 106 are formed in the inner surface of housing 102 and provide a space for the radial bearing pads 104. An example of a tilt member 108 is illustrated and which is disposed on a side of radial bearing pads 104 opposite from its contact with shaft 40. In the example illustrated, tilt member 108 is a lozenge-type member and having an elliptical cross-section. Alternatively tilt member 108 is integral with or attached to the outer radial surface of radial bearing pads 104. The curved surfaces of the tilt member 108 allow for pivoting or tilting of radial bearing pad 104 with respect to recesses 106. Further included with the radial bearing assembly 54 is a resilient member 110 which is set in a jacket 112 and provides a backstop for the tilt member 108 and which allows for further tilting of radial bearing pads to allow for tolerances or other misalignments that may occur along the outer surface of shaft 40. In the example of FIG. 6, a channel 114 is formed along inner wall of housing 102 and which the jacket 112 is inserted. The structure radially past the bottom of the channel 114 provides a base for securing the jacket and resilient member. Also shown in FIG. 6 are openings 118 on an outer surface of housing 102 and that provides a means for securing the radial bearing assembly 54 within housing 38 of FIG. 2.

Example materials of the tilting pad 72, tilting pad 86, base 68, base 93, thrust runner 60, and inlay 100A include tungsten carbide, polycrystalline diamond ("PCD") and ultra-strong PCD ("USPCD"). An example of USPCD is found in Liu et al., Superstrong Micro-Grained Polycrystalline Diamond Compact Through Work Hardening Under High Pressure, Appl. Phys. Lett. 112, 061901 (2018) ("Liu et al 2018"), which is incorporated for reference herein its entirety and for all purposes. In Liu et al. 2018 formation of USPCD includes use of a two-stage multi-anvil apparatus and pressures up to 35 GPa and temperatures up to 2,000 C. The process of Liu et al. 2018 is performed without the use of catalyst, unlike conventional processes for forming PCD that include the addition of cobalt as a catalyst. Metallic fracture toughness of USPCD is 19 MPa/m whereas it is about 8 MPa/m for PCD made with catalyst, and hardness of USPCD is 120 GPa and that of PCD made with catalyst is about 60 GPa to about 70 GPa.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. An electrical submersible pumping ("ESP") system comprising:
    a motor;
    a pump;
    a seal;
    a shaft coupled with the motor and the pump; and
    a thrust bearing assembly coupled with the shaft and that comprises,
        an up thrust bearing having,
            an up thrust resilient member,
            an up thrust bearing pad, and
            a tilt member lengthwise on the up thrust bearing pad that engages the up thrust resilient member, the up thrust bearing pad formed entirely from ultra-strong micro-grained polycrystalline diamond compact ("USPCD") material that is formed without a catalyst, and
        a down thrust bearing having,
            a down thrust resilient member, and
            a down thrust bearing pad having a tilt member along its length that engages the down thrust resilient member.

2. The ESP system of claim 1, wherein,
    the up thrust bearing further comprises a planar up thrust base, a plurality of additional up thrust bearing pads, fasteners that couple the up thrust bearing pads to the up thrust base,
    and a channel lined with a metal casing in which the up thrust resilient member is disposed, and wherein
    the down thrust bearing further comprises a planar down thrust base, a plurality of additional down thrust bearing pads, fasteners that couple the down thrust bearing pads to the down thrust base, and a channel with a metal casing in which the down thrust resilient member is disposed.

3. The ESP system of claim 2, wherein the thrust bearing assembly further comprises a planar thrust runner keyed to the shaft and disposed between the up thrust bearing and down thrust bearing.

4. The ESP system of claim 3, wherein the up thrust base, the down thrust base, and the thrust runner are all formed entirely from ultra-strong micro-grained USPCD material.

5. The ESP system of claim 3, further comprising an annular shaped inlay on a surface of the planar thrust runner that is in selective sliding contact with the one of the up thrust bearing pads or down thrust bearing pads, and wherein the inlay is formed entirely from ultra-strong micro-grained USPCD material.

6. An electrical submersible pumping system ("ESP") system comprising:
    a motor;
    a shaft coupled with the motor;
    a pump having impellers that engage the shaft; and
    a bearing assembly coupled with the shaft and that comprises
    a substrate that comprises,
    a resilient material,
    a planar base having a channel in which a resilient member is disposed, a metal casing lining the channel, and
    a bearing pad that is formed entirely from ultra-strong micro-grained polycrystalline diamond compact ("USPCD") material and having a contact surface in selective engagement with a rotating element and a side opposite the contact surface that is in tilting engagement with the substrate, and
    a ridge projecting from the side opposite the contact surface and which is in contact with the resilient member.

7. The ESP system of claim 6, wherein the bearing pad selectively tilts about multiple axes.

8. The ESP system of claim 6, wherein the bearing pad comprises an up thrust bearing pad, the base comprises an up thrust base, the channel comprises an up thrust channel, the resilient member comprises an up thrust resilient member, the metal casing comprises an up thrust metal casing and that collectively define an up thrust bearing assembly.

9. The ESP system of claim 8 further comprising a thrust runner and a down thrust bearing assembly that comprises a down thrust bearing pad, a down thrust base, a down thrust channel, a down thrust resilient member, and a down thrust metal casing, and wherein the up thrust bearing assembly, the down thrust bearing assembly, and the thrust runner are formed entirely from ultra-strong micro-grained USPCD material.

10. An electrical submersible pumping system ("ESP") system comprising:
    a motor having an attached shaft;
    a pump connected to the shaft distal from the motor; and
    a radial bearing assembly in selective rotating contact with the shaft and that comprises,
        a bearing pad formed from a polycrystalline diamond compact, and
        a substrate comprising an annular housing with a channel and a resilient member in the channel and on which the bearing pad selectively tilts about multiple axes.

11. The ESP system of claim 10, wherein the polycrystalline diamond compact comprises an ultra-strong micro-grained polycrystalline diamond compact formed from a catalyst free process.

12. The ESP system of claim 10, further comprising the resilient member in the housing that is engaged by a tilting member.

13. The ESP system of claim 12, further comprising a jacket that covers lateral and radially outward surfaces of the resilient member, and wherein the bearing pad tilts about the tilting member in a gimbal like fashion.

* * * * *